Sept. 20, 1966     J. I. EWING ETAL     3,274,608
SEISMIC PROFILER
Filed May 4, 1964                      2 Sheets-Sheet 1

INVENTORS.
JOHN I. EWING
ALBERT STOCKEL JR.
BY Ernest J. Weinberger
ATTORNEYS

Sept. 20, 1966     J. I. EWING ET AL     3,274,608
SEISMIC PROFILER
Filed May 4, 1964     2 Sheets-Sheet 2
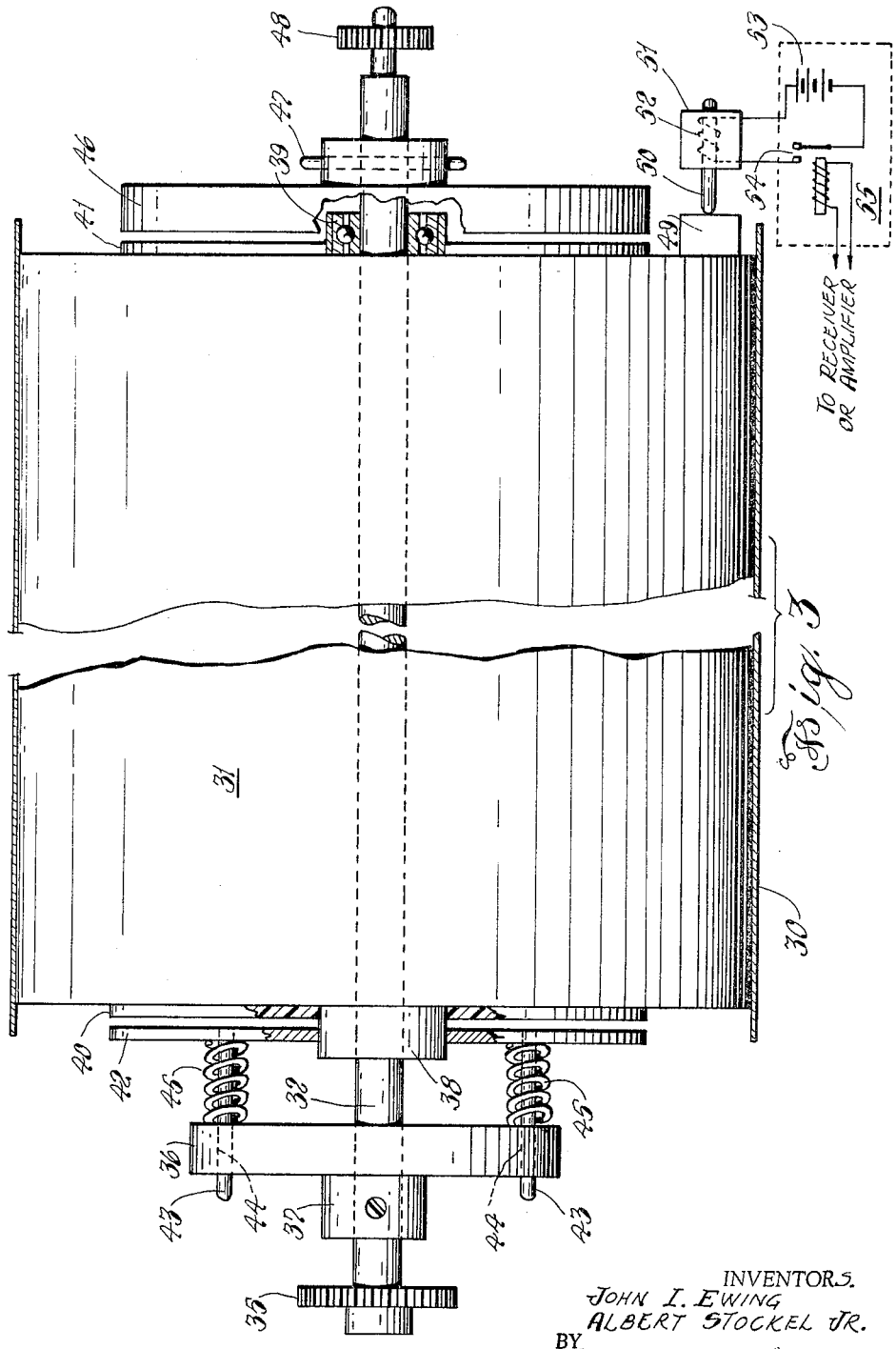

United States Patent Office 3,274,608
Patented Sept. 20, 1966

3,274,608
SEISMIC PROFILER
John I. Ewing, Palisades, and Albert Stockel, Jr., Bayville, N.Y., assignors to the United States of America as represented by the Secretary of the Navy
Filed May 4, 1964, Ser. No. 364,869
1 Claim. (Cl. 346—33)

This invention relates to apparatus for the recording of seismic waves and more particularly for the display of marine seismic profiling of the sea floor employing refraction and reflection data in the form of time-distance plots.

Generally in the art of underwater seismic profiling each reflected or refracted wave is plotted on a separate recording medium such as film, paper or tape. This entails the reading of arrival times of the various transmittal phases of the sound waves and the plotting, on an appropriate scale, of the time-distance relationship therebetween. Clearly two drawbacks become readily evident. First the amount of time involved is extensive, in addition, the handling, plotting and reading of vast quantities of individual occurrences. Further, this delay between the time of the occurrence and the final measurement in an intelligent form detrimentally affects subsequent measurements and limits any corrective procedures which might have been adopted. Secondly, in order to insure the accuracy of the measurements and to provide a true profile, it is necessary that the instant of initiation of the sound wave be accurately referenced for each occurrence and that they all start at the same point on the recording medium.

In overcoming various deficiencies in prior recording or data acquisition apparatus, a type of recording generally referred to as a continuous rotating drum recorder has come into use. Inherent in this equipment, which provides data in the form of parallel line traces circumferentially of the drum, is the necessity of initiating each individual trace from a common reference datum in order to directly obtain a meaningful profile and further to bring and maintain the rotational speed of the drum constant for the entire trace or recording period.

It is therefore an object of this invention to provide a drum type recording apparatus for seismic profiling which is simple, inexpensive, automatic, accurate and capable of synchronization with the instant of generation of the sound or seismic wave energy.

A further object is to provide seismic profiler in which the time change in drum speed from start to finish is minimized.

Other objects and advantages will appear from the following description of an example of the invention, and the novel features will be particularly pointed out in the appended claim.

In the accompanying drawings:

FIG. 3 is a sectional view of an embodiment of the drum recorder made in accordance with this invention.

Figure 1:
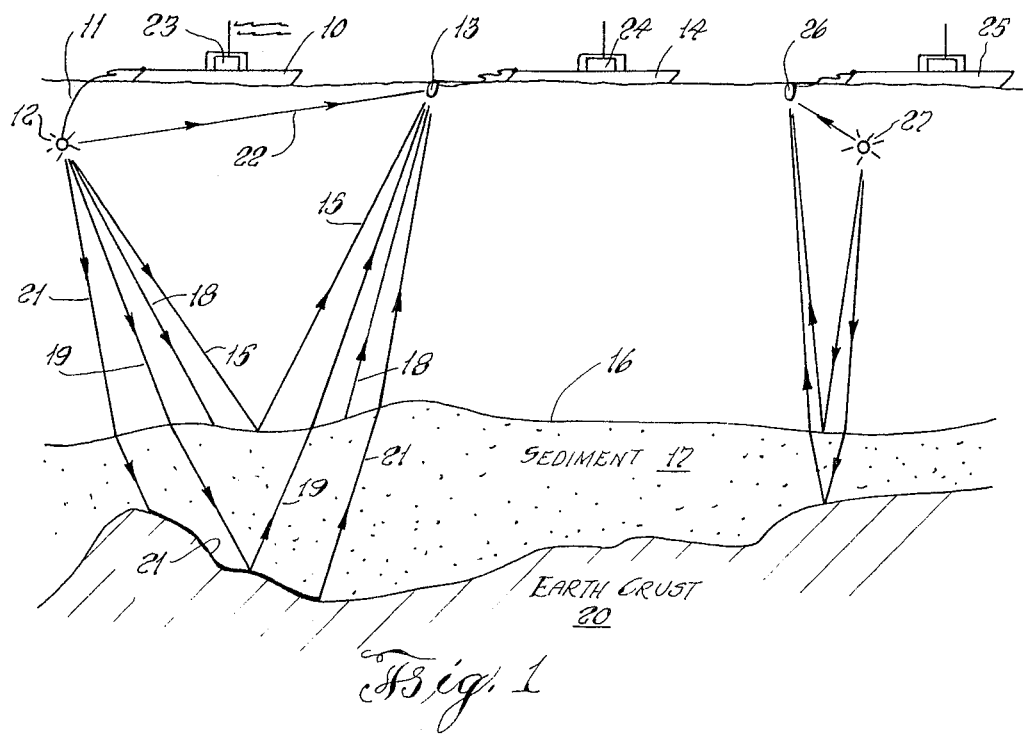
FIG. 1 is a representation of the relative locations of the vessels and the seismic waves in profiling the sea bottom.

FIG. 1 illustrates in general form the technique employed in ascertaining the ocean floor profile. The shooting vessel 10 tows at the end of a towed line 11, a source of seismic or sound energy 12 which may be in the form of a sound generator, a gas arc or an exploding charge, depending on the intensity required for that particular water depth and bottom formation and composition. Considering only those seismic waves which will reach and impinge upon a hydrophone 13 towed by the recording vessel 14, it is evident that at least five paths are possible under the environment shown. First and most evident is path 15, in which the wave is directly reflected from the upper surface 16 of sedimentary layer 17. The second path 18 comprises a first water path, a surface path along the sedimentary layer 17 and a return through the water to hydrophone 13. The third path 19 travels downwardly, is refracted at the interface between the water and layer 17, then is reflected by the earth's crust 20 taking an upward direction, again refracted at the interface and finally terminating at the hydrophone. The fourth path 21 and most complex path includes a refraction at the water-sediment interface, travel along the crust-sediment interface, and a sediment water refraction. Finally there is the direct path 22 from the source 12 to hydrophone 13. These seismic waves arrive at the hydrophone at different times which time is generally dependent on the path distances and are recorded by instrumentation aboard vessel 14. At the shot instant or initiation of the seismic wave, a transmitter 23 on the shooting vessel sends out a signal which is received (receiver 24) by vessel 14 and starts the data recording cycle which will be explained hereinafter. A relatively simple arrangement for the two ship profiling method is where the shooting ship travels in a linear direction toward or away from the recording ship and initiates the sound waves at periodic intervals selected in accordance with environment and the type of data desired.

Since the invention encompassed by this specification can be equally well applied to single ship reflected profile measurements, attention is directed to ship 25 which tows both a slack cabled hydrophone 26 and as illustrated periodically drops an exploding charge 27. For reflected measurements only two reflected paths are of interest, namely, the reflections from the upper sediment surface 16 and the interface of the sediment and the earth's crust. In this case the explosion itself will generate an addition wave path directly to the hydrophone which may be employed to start the recording or if the explosive or source is electrically detonated, this same electrical signal can be used to initiate the recording cycle.

Figure 2:
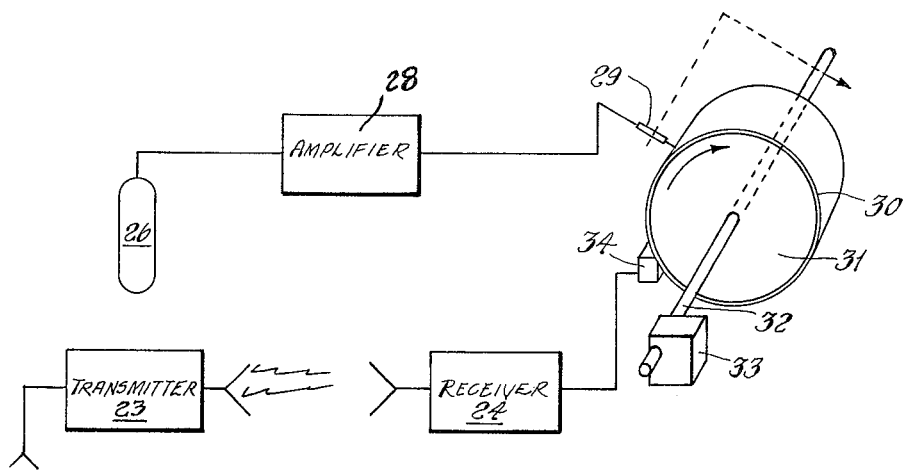
FIG. 2 is a diagrammatic representation of an embodiment of the drum and associated equipment employed in recording of the ocean floor profile made in accordance with the principle of this invention.

As illustrated in FIG. 2 the sound waves impinging on the hydrophone are first amplified by the amplifier 28 to a level sufficient to permit the recording stylus 29 to write on a recording medium 30 which is circumferentially supported around drum 31. The drum is rotated and supported by shaft 32 which is powered by a motor, as for example, a synchronous motor 33, whereby the speed of rotation can be maintained constant at a selected speed. The motor 33 may be energized by a stable frequency source such as a chronometer (not shown). The stylus 29 is coupled to the shaft 32 so as to provide slow linear movement of the stylus axially of the drum as the drum revolves. The stylus under these conditions prints out on the recording medium approximately parallel linear traces of the seismic signals received by the hydrophone. The drum is coupled to the shaft by clutch means (not shown in FIG. 2) such that where the drum is held or restrained against rotation, the shaft will continue to revolve at its synchronized speed. For this purpose a drum stop means indicated generally at 34, is provided to normally prevent rotation of the drum until it is acted upon to release the drum and permit at least one complete revolution thereof. As shown, a transmitter 23 emits a signal which, after passing through the receiver 24, causes the stop means to release.

The drum, stylus, chronometer and amplifier may be obtained as a system such as the Times Facsimile Drum Recorder manufactured by the Westrex Corporation.

A detailed illustration of the drum is shown in FIG. 3. The worm gear 35 couples the shaft 32 to the synchronous motor or drive 33 (not shown) and by the simple expedient of changing this gear the drum rotational speed can be altered. A rigid pressure plate 36 is affixed to the shaft 32 by a boss portion 37 having a lock set screw for setting the position of the pressure plate along the shaft. The drum 31 is supported on the shaft for rotation therewith by a pair of bearings 38 and 39 disposed at opposite ends of the drum. The outer casing of the bearings each carries a sliding type clutch plate (40, 41), as for example, a "Teflon" (trademark of Du Pont, Inc.) tetrafluoroethylene polymer disc affixed to the end of the drum. Disposed between disc 40 and the pressure plate 36 is a rigid clutch plate 42 which carries a number of laterally extending pins 43 that pass through openings 44 in the pressure plate and permit relative displacement therebetween while allowing plate 42 to rotate with the shaft. Surrounding the pins 43 between the plates are coil springs 45 which urge the clutch plate 42 away from pressure plate 36 and toward disc 40 so that the shaft rotation is coupled from the shaft through this clutch system to the drum. The opposite end of the shaft extends beyond the end of the drum and carries clutch plate 46 rigidly affixed by dowel pin 47 to the shaft. This plate is not adjustable lengthwise of the shaft and as pressure plate 36 urges clutch plate against disc 40 the drum is displaced toward the right so as to force disc 41 into face to face contact with clutch plate 46 positively coupling the shaft to the drum. The end of the shaft carries a gear 48 which in turn rotates a lead screw (not shown) that produces linear movement of the stylus lengthwise of the drum 31. A release stop means comprising a stop block 49 rotatable with the edge of the drum and secured thereto and a solenoid operated stop pin 50. The pin 50 is supported by a frame 51 and is free to move laterally thereof so that the pin extends proximate the edge of the drum 31. In this normal position of the pin the stock block bears against the pin and prevents rotation of the drum. With the energization of the solenoid coil 52 which surrounds the pin, the pin is caused to retract away from the drum and thereby allow it to rotate freely. In its simplest form the release means can include in addition to the solenoid a source of electrical energy such as battery 53 in series therewith and being of sufficient energy to actuate the solenoid. In this series line, the contacts 54 of a high sensitivity relay 55 are inserted. Since the relay is highly sensitive a low level of amplitude is sufficient and when connected to the proper receiver output, the input signal to the receiver will actuate the stop pin 50. Under certain conditions, in order to provide a greater triggering signal, an amplifier may be inserted between the receiver and the relay. The signal input is in the form of a relative short duration pulse or trigger and the solenoid is deactivated almost immediately after the pin releases so that it again engages the stop block 49 after the drum has made one complete revolution. The contacts 54 can be manually operated and thus provide independent control of the drum.

In operation the drum cycle may be initiated by either the receiving of the direct wave or by the electromagnetic transmitted signal. In either event the solenoid is actuated and the drum commences its rotation. During its rotation the stylus records the hydrophone received waves as approximately parallel traces. In this regard it is customary to remove the printing voltage from the stylus when the drum is stopped. Since the stop block is stationary with respect to the drum, the drum will always stop and start at the same reference or datum point. Additionally, the pressure clutch is readily adjusted by loosening the lock screws and sliding the pressure plate along the rotating shaft. Since the drum is free to slide along the shaft, the clutch pressures are equal at both ends of the drum. In normal position the aluminum drum 31 is held fixed by contact of the solenoid stop pin 50 with the drum stop block 49. During this time, the clutch disks 42 and 46 slide over the Teflon discs 40 and 41 of the drum at a constant angular velocity. At some instant (for example, the instant the shot detonates) the solenoid actuates withdrawing the stop pin from the stop block, and the drum accelerates to the speed of the rotating shaft. Due to the light construction of the drum, the pickup time is very short. The drum continues to turn at constant speed for one revolution until the stop block has returned to the solenoid stop pin whereupon the drum is stopped.

It will be understood that various changes in the details, materials and arrangements of parts (and steps), which have been herein described and illustrated in order to explain the nature of the invention, may be made by those skilled in the art within the principle and scope of the invention as expressed in the appended claims.

We claim:

In an apparatus for seismic profiling wherein a plurality of seismic traces are arranged in parallel relation on a record medium having a cylindrical record supporting drum adapted for mounting said record medium circumferentially thereon, means for recording thereon said traces, that improvement for providing a common datum reference which comprises:

a rotatable shaft coaxial with said drum,
    means for rotating said shaft,
    clutch means disposed on opposite ends of said drum and carried by said drum and said shaft coupling said shaft and drum for rotation thereof,
    said clutch means including a first disc carried by said shaft,
    a second disc carried by said drum, and
    means urging said discs into contact,
    stop means for selectively holding said drum stationary while said shaft rotates,
    said stop means including
        a first member carried by said drum,
        a second stationary member having a portion movable to engage and disengage with said first member to prevent rotation of said drum,
    electrical means for releasing said stop means upon the occurrence of an event for a selected number of complete revolutions of said drum,
    said electrical means including
        an electrical solenoid having a movable actuating member coupled to said portion for moving the same into and out of the path of said first member and means for actuating said solenoid,
        said event being the initiation of a seismic wave at a point remote from said apparatus and further including
        a transmitter at said remote point,
        a receiver having its output coupled to actuate said solenoid whereby at the instant said wave is initiated, a signal will be transmitted by said transmitter, received by said receiver and simultaneously start said drum rotating.

References Cited by the Examiner

UNITED STATES PATENTS

| | | | |
|---|---|---|---|
| 2,003,780 | 6/1935 | Born | 181—0.5 |
| 2,575,442 | 11/1951 | Cooley | 346—138 |
| 2,704,191 | 3/1955 | Schley et al. | 64—30 |
| 3,029,894 | 4/1962 | Parr | 181—0.5 |

RICHARD B. WILKINSON, *Primary Examiner.*

LOUIS J. CAPOZI, *Examiner.*

JOSEPH W. HARTARY, *Assistant Examiner.*